Patented Aug. 8, 1950

2,517,944

UNITED STATES PATENT OFFICE 2,517,944

POLYMERIC BORONAMIDES

Robert W. Upson, Wilmington, Del., assignor to E. I. du Pont de Nemours & Company, Wilmington, Del., a corporation of Delaware No Drawing. Application December 16, 1946, Serial No. 716,674

18 Claims. (Cl. 260—2)

This invention relates to organo-inorganic polymers. More particularly this invention relates to new organo-boron polymers, to a method of their preparation and to films and fibers made from these new polymers.

Polymers derived from organic compounds are well known. However, relatively little is known of polymers derived from organo-inorganic compounds. While boronic acids and a variety of organo-boron compounds have been described in the literature, no polymeric materials derived from boronic acids have heretofore been known.

It is an object of this invention to provide new polymeric materials containing boron and a method for their preparation. A further object is to prepare organo-boron polymers containing boron-nitrogen bonds. Another object is to prepare organo-boron polymers that are suitable for the preparation of fibers and films. A still further object is to prepare clear, transparent fibers and films of organo-boron polymers. Other objects will appear hereinafter.

These objects are accomplished by the following invention of polymeric boronamides, that is polyamides of boronic acids, and a process for preparing them which comprises reacting a boronic acid with an organic compound containing a plurality of separate NCX groups, wherein X is a chalcogen having an atomic weight under 33, that is oxygen or sulfur. In a preferred embodiment of this invention, a boronic acid is reacted with a member selected from the class consisting of polyisocyanates and polyisothiocyanates, at a temperature of 35° to 200° C. This invention includes derivatives of polymeric boronamides such as the N-alkoxymethyl polyboronamides. These polyboronamides and their derivatives all possess the characteristic features in the polymer chain of a plurality of boronamide groups

wherein R is a monovalent organic radical, such as a monovalent substituted or unsubstituted aromatic, aliphatic, unsaturated aliphatic, cycloaliphatic or hydrocarbon radical.

Boronic acids have the formula RB(OH)₂ wherein R is an organo group, such as substituted or unsubstituted, aromatic, aliphatic, unsaturated aliphatic, and cycloaliphatic groups. The preferred boronic acids are the hydrocarbon boronic acids which have the formula RB(OH)₂ wherein R is a hydrocarbon radical. Particularly preferred are boronic acids containing the —C=C—B group, such as the arylboronic acids, for example benzeneboronic acid, and vinylboronic acids. These boronic acids are more resistant to oxidative cleavage of the boron-carbon bond than acids containing the —CH₂—B group.

Any polyisocyanate or polyisothiocyanate can be used in this invention. However, it is preferred to use diisocyanates and diisothiocyanates because of their ease of preparation, low cost, reactivity and reaction with boronic acids to form linear polymers. Thus any diisocyanate or diisothiocyanate or mixed isocyanate-isothiocyanate of the general formula XCNR′NCX′, in which R′ is a divalent hydrocarbon radical and X and X′ are selected from the class consisting of oxygen and sulfur, will react with a boronic acid to give linear polymers according to this invention. The products formed are polyamides of boronic acids containing the recurring structural unit

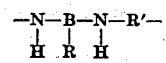

wherein R is a monovalent organic radical and R′ is a divalent hydrocarbon radical. For example, the reaction of benzeneboronic acid with hexamethylene diisocyanate or hexamethylene diisothiocyanate gives polymeric N,N′-hexamethylenebenzeneboronamide which contains the recurring structural unit

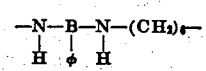

A convenient way to carry out the reaction for the preparation of these new organo-boron polyamides is to add a solution containing a boronic acid, preferably benzeneboronic acid, and a tertiary amine such as triethylamine, dissolved in an inert, anhydrous solvent such as benzene, to a dry reaction vessel equipped with a reflux condenser, mechanical stirrer, dropping funnel and nitrogen inlet tube. Dry nitrogen gas is passed through the reaction vessel until essentially all of the air in the reaction vessel has been displaced with nitrogen. The stirrer is then started and the solution heated to reflux temperature. A solution containing a polyisocyanate or a polyisothiocyanate dissolved in an inert, anhydrous solvent such as benzene or ether, preferably a solution containing an equimolar amount of a diisocyanate or a diisothiocyanate, based on the boronic acid, is added slowly to the refluxing boronic acid solution over a period of 0.5 to 5.0 hours. Sufficient solvent is used to give a clear, homogeneous solution after all the isocyanate has been added. The reaction solution is stirred and heated at reflux temperature for a further 0.5 to 15 hours or until no more carbon dioxide or carbon oxysulfide is liberated.

If desired, the reactants may be added in the reverse order to that described above. Carbon dioxide or carbon oxysulfide is liberated in the reaction, depending on whether an isocyanate or an isothiocyanate is used. The temperature at which the reaction is carried out is determined by the boiling point of the solvent used. After evolution of $CO_2$ or COS is complete, the solvent is removed from the reaction mixture by distillation. The polymeric material that remains in the reaction vessel is transferred to a filter, washed with a solvent such as anhydrous ether to remove any unreacted boronic acid and polyisocyanate, and dried.

The polymers are, in general, white solids of high softening points. They are soluble in phenol and in some cases soluble in formic acid, benzene and ether. These organo-boron polymers can be pressed at elevated temperatures into films and extruded into fibers. Their solutions can be formed into films and fibers by conventional methods. The better polymers are susceptible to limited cold drawing.

The following examples in which parts are given by weight, unless otherwise specified, further illustrate the invention.

Example I

To a reaction vessel fitted with a mechanical stirrer, nitrogen inlet tube and condenser set for distillation, was added a solution containing 100 parts benzeneboronic acid and 138 parts hexamethylene diisocyanate dissolved in 176 parts benzene. The vessel was heated for 2 hours at a temperature of 90° C. to remove the benzene and then heated for 16 hours at a temperature of 148° C. Dry nitrogen gas was passed through the vessel and over the reactants during the heating period. A solid polyamide of benzeneboronic acid was obtained that was washed with anhydrous ether and benzene, and dried. The product was soluble in phenol and softened with decomposition at 300° C. Analyses indicated that the polymer contained 3.1% boron and 12.8% nitrogen.

Example II

To a dry reaction vessel equipped with a mechanical stirrer, reflux condenser, dropping funnel, and nitrogen inlet tube were added 244 parts benzeneboronic acid and 880 parts anhydrous benzene. The air within the vessel was displaced with dry nitrogen gas and the benzeneboronic acid was dissolved by heating the mixture to refluxing temperature, with stirring. To the refluxing solution was then added 35.8 parts triethylamine. To the resulting clear solution was added dropwise, over a period of 1 hour, a solution containing 336 parts hexamethylene diisocyanate, 35.8 parts dodecyl alcohol, and 440 parts anhydrous benzene. Carbon dioxide was liberated on addition of the hexamethylene diisocyanate solution. The reaction mixture was stirred and refluxed under dry nitrogen for 4 hours after all the hexamethylene diisocyanate was added. The product that separated from the reaction solution was collected on a filter, washed with anhydrous ether, and dried. The product contained 7.2% boron, was soluble in phenol and in formic acid, and softened at 255° C. A transparent, pliable film was pressed from this polyamide at a temperature of 275° C. A second polymer fraction that contained 6.4% boron, softened at 210° C., and was soluble in phenol was obtained by removing the solvent from the reaction mixture filtrate.

Example III

To a dry reaction vessel of the type used in Example II were added 244 parts benzeneboronic acid, 202 parts triethylamine, and 1320 parts anhydrous benzene. Dry nitrogen gas was passed over the resulting solution to displace the air within the vessel and the solution was heated to reflux temperature. To this solution was added, with stirring, a solution containing 500 parts methylene-bis(4-phenyl isocyanate) dissolved in 440 parts anhydrous benzene over a period of 1 hour. Carbon dioxide was evolved and a precipitate formed on addition of the methylene-bis(4-phenyl isocyanate). The reaction mixture was stirred and refluxed under nitrogen for 3 hours after all the isocyanate was added. The product was collected on a filter, washed with anhydrous ether, and dried. The polymer contained 1.7% boron and softened at 270° C. Smooth films were pressed from this polymer at a temperature of 300° C. From the filtrate was obtained a second polymer fraction that contained 5.2% boron and softened at 215° C.

Example IV

A solution of 183 parts benzeneboronic acid and 202 parts triethylamine in 1320 parts anhydrous benzene was reacted with a solution of 252 parts hexamethylene diisocyanate in 440 parts anhydrous benzene by the procedure of Example III. The product, isolated as in that example, contained 1.7% boron and 16.0% nitrogen, was soluble in phenol and in formic acid, and softened at 235° C. This polyboronamide was extruded at a temperature of 254° C. under a pressure of about 500 p. s. i. into a monofil having a diameter of 20 mils (0.020 inch). This monofil was clear and transparent, and could be drawn when stress was applied to it at room temperature.

Example V

To a dry reaction vessel were added 122 parts of benzeneboronic acid, 12.2 parts triethylamine, and 174 parts toluene-2,4-diisocyanate. The reactants were heated at a temperature of 120° C. for 1 hour in an atmosphere of dry nitrogen gas, which caused $CO_2$ to be evolved and a solid polymeric product to form. This solid was heated at a temperature of 190° C. for 0.5 hr. under dry nitrogen, after which time evolution of $CO_2$ ceased. The light yellow product obtained was ground to a powder, washed with anhydrous ether and acetone, and dried. The polymer contained 2.7% boron and softened at 265° C.

Example VI

To a dry reaction vessel of the type used in Example II were added 160 parts β-chlorovinylboronic acid and 1320 parts anhydrous benzene. Dry nitrogen gas was passed through the reaction vessel for one hour to displace the air within the flask, and then the stirrer was started and the solution heated to reflux to dissolve the β-chlorovinylboronic acid. To the refluxing solution was added, during a period of 0.5 hour, a solution containing 252 parts hexamethylene diisocyanate dissolved in 440 parts anhydrous benzene. Carbon dioxide was liberated from the reaction on addition of hexamethylene diisocyanate. The reaction solution was stirred and refluxed in an atmosphere of dry nitrogen for 3 hours after all the hexamethylene diisocyanate was added. At the end of this time evolution of $CO_2$ was complete and a white precipitate had formed. The polyboronamide was collected on a filter, washed with anhydrous ether, and dried. The polymer contained 3.5% boron and softened at 160° C. Films were pressed from this polymer at a temperature of 225° C.

Example VII

A solution was prepared by dissolving 50 parts of polymeric N,N'-hexamethylenebenzeneboronamide containing 14.9% nitrogen and 1.9% boron, and having a softening point of 195° C., in 200 parts formic acid (sp. gr. 1.2) at a temperature of 60° C. To this solution was added a solution containing 5 parts paraformaldehyde, 15.8 parts methanol, and 2.6 parts of aqueous 10% potassium hydroxide solution. The resulting solution was stirred at a temperature of 60-70° C. for 30 minutes and then poured into a solution containing 1000 parts water and 790 parts acetone. On neutralization of this solution with ammonium hydroxide, a white precipitate formed that was collected on a filter, washed with water, and dried. The methoxymethyl polyboronamide softened at 75° C., was soluble in methanol and could be pressed into colorless, transparent films that were elastic and pliable.

Other N-alkoxymethyl polyboronamides can be prepared by reacting a polyboronamide with formaldehyde and an alcohol or mercaptan in the presence of an oxygen-containing acid as catalyst. Suitable alcohols include methyl, ethyl, n-butyl, cyclohexyl, and β-ethoxyethyl alcohols, and suitable mercaptans include ethyl, butyl, and octyl mercaptans. Oxygen-containing acids which are particularly useful as catalysts in this process are those having an ionization constant of at least $9.6 \times 10^{-6}$ and an equivalent conductance, measured at 25° C. in 0.01 N concentration, no greater than 370 ohms$^{-1}$ cm.$^2$ Specific examples of suitable acids are formic, oxalic, chloroacetic, and phosphoric acids.

In general, the N-alkoxymethyl polyboronamides are white solids of lower softening point than the unsubstituted polyboronamides from which they are derived. They are soluble in alcohols such as methyl alcohol, alcohol-water mixtures, formic acid, acetic acid, phenol, and the like. They can be formed into films and fibers which are pliable and elastic.

The polyboronamides contain the recurring structural unit

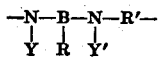

wherein R is a monovalent organic radical, R' is a divalent hydrocarbon radical, and Y and Y' are selected from the class consisting of hydrogen and alkoxymethyl radicals. In the N-alkoxymethyl polyboronamides at least some of the nitrogen atoms have attached thereto an alkoxymethyl group and the remaining nitrogen atoms have hydrogen attached thereto.

The boronic acids used in this invention may be prepared by reaction of a Grignard reagent with an ester of boric acid as described in J. A. C. S. 54, 4415 (1932). In general, any boronic acid may be used but the organic group should not contain substituents that react with the boronic acid group or the isocyanate and isothiocyanate groups, that is any substituent groups in the organo group of the boronic acid should be unreactive toward the boronic acid group and the isocyanate and isothiocyanate groups.

Among the boronic acids useful in this invention are aromatic boronic acids, such as benzeneboronic acid, α-naphthaleneboronic acid, β-naphthaleneboronic acid, ortho- and para-tolueneboronic acids, and p-chlorobenzeneboronic acid; aliphatic boronic acids, such as methaneboronic acid, ethaneboronic acid, propaneboronic acid, benzylboronic acid, and β-chloroethylboronic acid; cycloaliphatic boronic acids, such as cyclopentaneboronic acid and cyclohexaneboronic acid; and unsaturated aliphatic boronic acids, such as vinylboronic acid, chlorovinylboronic acid, phenylvinylboronic acid, and allylboronic acid. The unsaturated aliphatic boronic acids are especially useful in this invention.

The polyisocyanates and polyisothiocyanates are obtainable by known procedures, for example hexamethylene diisocyanate can be obtained by the process described in U. S. Patent 2,374,340, issued April 24, 1945. Examples of various types of polyisocyanates and polyisothiocyanates particularly useful in this invention are polymethylene diisocyanates and diisothiocyanates, such as ethylene-, trimethylene-, and hexamethylene diisocyanates and the corresponding diisothiocyanates; alkylene diisocyanates and diisothiocyanates, such as propylene 1,2-, butylene-2,3- and butylene-1,3-diisocyanates and the corresponding diisothiocyanates; alkylidene diisocyanates and diisothiocyanates such as ethylidene-, butylidene-, and heptylidene diisocyanates and the corresponding diisothiocyanates; cycloalkylene diisocyanates and diisothiocyanates, such as cyclopentylene-1,3- and cyclohexylene-1,2-diisocyanates and the corresponding diisothiocyanates; aromatic diisocyanates and diisothiocyanates, such as meta-phenylene-, p-phenylene-, toluene-2,4-, naphthalene-1,4- and diphenyl-4,4'-diisocyanates and the corresponding diisothiocyanates; and aliphatic aromatic diisocyanates and diisothiocyanates, such as p-phenylene-bis(methyl isocyanate), and methylene-bis(4-phenyl isocyanate) and the corresponding diisothiocyanates. As examples of compounds containing more than two isocyanate or isothiocyanate groups may be mentioned 1,2,4-benzene triisothiocyanate and butane-1,2,2-triisocyanate.

The reaction of a boronic acid with a polyisocyanate or polyisothiocyanate can be conducted either in the presence or absence of a solvent. However, it is preferred to carry out the reaction in the presence of an inert solvent to facilitate thorough mixing of the reactants and to provide a means for controlling the reaction temperature. Sufficient solvent is used to give a homogeneous solution when the boronic acid and polyisocyanate or polyisothiocyanate are mixed. Suitable solvents include benzene, toluene, xylene, ethers, dioxane and hydrocarbon solvents such as hexane, cycloheptane and the like. In general, any inert solvent may be used, that is any solvent may be used that does not contain groups reactive to the boronic acid or isocyanate groups. It is preferred to use anhydrous solvents.

It is desirable to react equi-molar quantities of a diisocyanate or diisothiocyanate with a boronic acid, since under these conditions the polymers formed are linear. Modifying agents such as alcohols, e. g. dodecyl alcohol, may be added to the reactants either at the start of the polymerization or at any stage of the polymerization. These agents act to terminate polymer chains and are useful in controlling the molecular weights of the polymers. The reaction is preferably conducted in the absence of oxygen and moisture, which may be accomplished by operating in partial vacuum or in the presence of an inert gas, such as nitrogen. It is also desirable, but not essential, to include with the reactants a modifying agent such as a tertiary amine, e. g., triethylamine, or a polyhydric alcohol, e. g., glycerol. These particular materials greatly increase the rate of reaction of the boronic acid with the polyisocyanate or polyisothiocyanate.

The reaction time and temperature are interdependent variables. In general, it is desirable to operate at temperatures above 35° C. and below 200° C. The preferred temperature range is 50° to 150° C. Reactions carried out at temperatures below 50° C. must be conducted for several hours to produce a polymer. Reactions carried out at temperatures substantially above 150° C. proceed rapidly and are likely to result in insoluble, infusible products. At any one temperature, the reaction is carried out until formation of $CO_2$ or COS is complete. The polymerization is preferably stopped before the polymer formed becomes insoluble in phenol. A convenient way to control the reaction temperature is to carry out the reaction at reflux temperature in the presence of a solvent whose boiling temperature is the desired reaction temperature.

The polymer may be freed of solvent by direct distillation of the solvent under atmospheric or reduced pressure. It is advantageous in some cases to operate in a medium in which the polymer is insoluble and from which it separates as it forms.

The products of this invention are suitable for use in the preparation of fibers, films and molded objects.

As many apparently widely different embodiments of this invention may be made without departing from the spirit and scope thereof, it is to be understood that the invention is not limited to the specific embodiments thereof except as defined in the appended claims.

I claim:
1. Polymeric N,N' - hexamethylenebenzeneboronamide.
2. A film comprising polymeric N,N'-hexamethylenebenzeneboronamide.
3. A fiber comprising polymeric N,N'-hexamethylenebenzeneboronamide.
4. A polymeric amide of a boronic acid selected from the class consisting of hydrocarbon and chlorohydrocarbon boronic acids, said polymeric boronamide containing the recurring structural unit

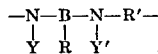

wherein R is selected from the class consisting of hydrocarbon and chlorohydrocarbon, R' is a divalent hydrocarbon radical and Y and Y' are selected from the class consisting of hydrogen and alkoxymethyl radicals.

5. A polymeric amide of a hydrocarbon boronic acid, said polymeric boronamide containing the recurring structural unit

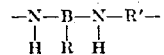

wherein R is a monovalent hydrocarbon radical and R' is a divalent hydrocarbon radical.

6. A polymeric amide of a hydrocarbon boronic acid containing the —C≡C—B(OH)$_2$ grouping, said polymeric boronamide containing the recurring structural unit

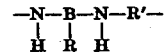

wherein R is a monovalent hydrocarbon radical containing a —C≡C— group directly connected to B and R' is a divalent hydrocarbon radical.

7. A polymeric amide of benzeneboronic acid, said polymeric boronamide containing the recurring structural unit

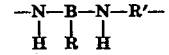

wherein R is phenyl and R' is a divalent hydrocarbon radical.

8. A polymeric amide of a hydrocarbon boronic acid, said polymeric boronamide containing the recurring structural unit

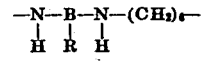

where R is a monovalent hydrocarbon radical.

9. A polymeric amide of a chlorohydrocarbon boronic acid, said polymeric boronamide containing the recurring structural unit

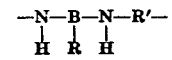

wherein R is a monovalent chlorohydrocarbon radical and R' is a divalent hydrocarbon radical.

10. A polymeric amide of beta-chlorovinylboronic acid, said polymeric boronamide containing the recurring structural unit

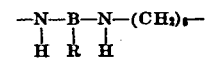

wherein R is the beta-chlorovinyl radical.

11. A polymeric amide of benzeneboronic acid, said polymeric boronamide containing the recurring structural unit

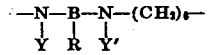

wherein R is phenyl and Y and Y' are methoxymethyl.

12. A process for preparing a polymeric amide of a boronic acid which comprises reacting at a temperature between 35° and 200° C. a boronic acid, containing as the sole reacting group —B(OH)$_2$, and selected from the class consisting of hydrocarbon and chlorohydrocarbon boronic acids with a compound selected from the class consisting of hydrocarbon diisocyanates and hydrocarbon diisothiocyanates in which the two isocyanate and isothiocyanate groups, respectively, are the sole reacting groups.

13. A process for preparing a polymeric amide of a boronic acid which comprises reacting at a temperature between 35° and 200° C. equimolar proportions of a hydrocarbon boronic acid containing as the sole reacting group —B(OH)$_2$ with a hydrocarbon diisocyanate containing as the sole reacting groups the two isocyanate groups.

14. A process for preparing a polymeric amide of a boronic acid which comprises reacting at a temperature between 35° and 200° C. equimolar proportions of a hydrocarbon boronic acid containing as the sole reacting group —B(OH)$_2$ with a hydrocarbon diisothiocyanate containing as the sole reacting groups the two isothiocyanate groups.

15. A process for preparing a polymeric amide of a boronic acid which comprises reacting at a temperature between 35° and 200° C. equimolar proportions of a hydrocarbon boronic acid containing as the sole reacting group —B(OH)₂ with hexamethylene diisocyanate.

16. A process for preparing a polymeric amide of a boronic acid which comprises reacting at a temperature between 35° and 200° C. equimolar proportions of benzeneboronic acid with a hydrocarbon diisocyanate containing as the sole reacting groups the two isocyanate groups.

17. A process for preparing a polymeric amide of a boronic acid which comprises reacting at a temperature between 35° C. and 200° C. equimolar proportions of beta-chlorovinylboronic acid with hexamethylene diisocyanate.

18. A process for preparing a polymeric amide of a boronic acid which comprises reacting at a temperature between 35° and 200° C. equimolar proportions of benzeneboronic acid with hexamethylene diisocyanate.

ROBERT W. UPSON.

REFERENCES CITED

The following references are of record in the file of this patent:

UNITED STATES PATENTS

| Number | Name | Date |
|---|---|---|
| 2,284,896 | Hanford et al. | June 2, 1942 |